(No Model.)
F. LAUHOFF.
PREPARATION OF CEREALS.
No. 440,866. Patented Nov. 18, 1890.
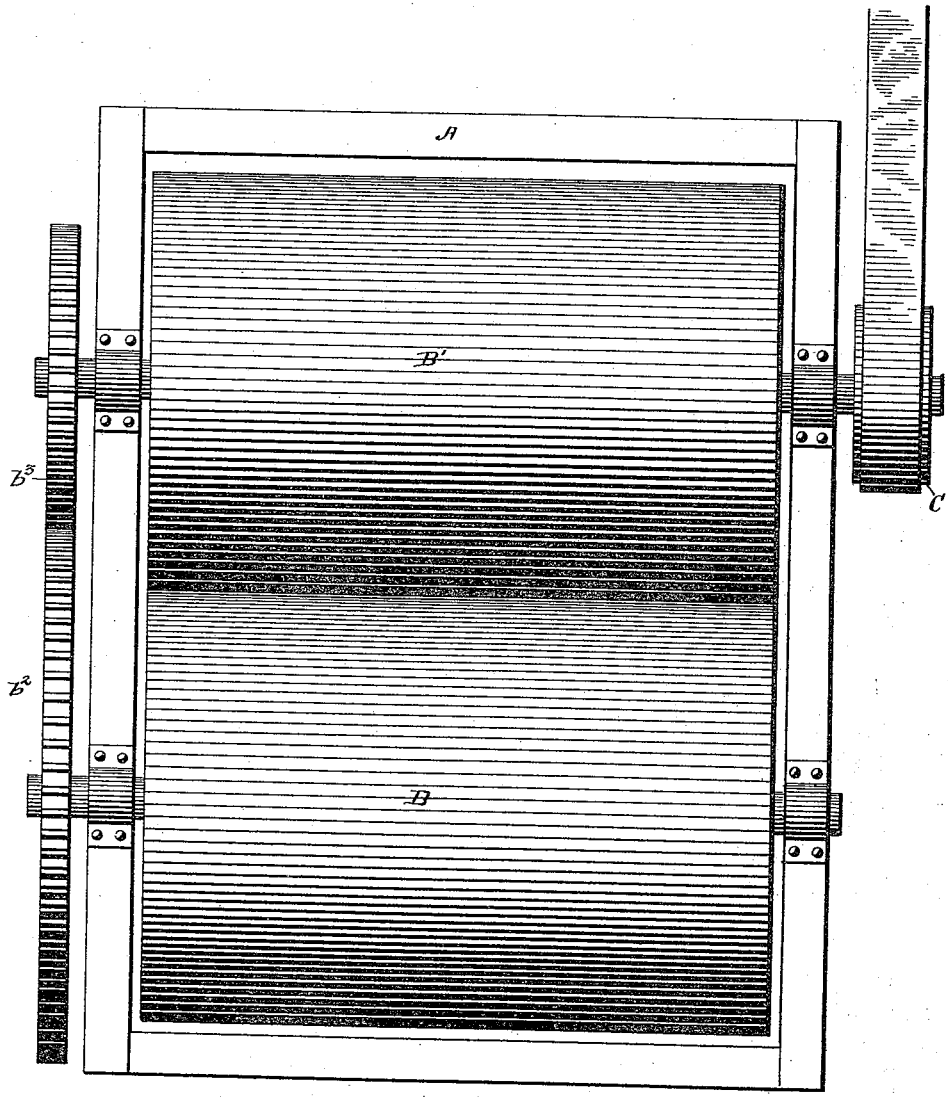

UNITED STATES PATENT OFFICE.

FRANK LAUHOFF, OF DETROIT, MICHIGAN.

PREPARATION OF CEREALS.

SPECIFICATION forming part of Letters Patent No. 440,866, dated November 18, 1890.

Application filed April 23, 1890. Serial No. 349,183. (No specimens.)

*To all whom it may concern:*

Be it known that I, FRANK LAUHOFF, a citizen of the United States, residing at Detroit, county of Wayne, State of Michigan, have invented a certain new and useful Improvement in the Preparation of Cereals; and I declare the following to be a full, clear, and exact description of the invention, such as will enable others skilled in the art to which it appertains to make and use the same.

My invention relates to a certain new and useful preparation of corn, as more fully hereinafter described and claimed, the same having particular reference to a reduction of the corn and other cereals to a superior product adapted for food, brewing, or distillation, as may be desired.

To this end my invention relates both to the new article of manufacture so produced and also to the process whereby said article is obtained.

I will explain my invention as applied to corn, although other cereals may be treated in the same manner as that here set forth within the scope of my invention.

The drawing is a plan view of a machine by which my improved article of manufacture may be produced.

In carrying out my invention the corn in its dry raw normal condition is first crushed into suitable granules or reduced to grits. I prefer to first reduce the corn to the form of coarse meal. The hulls, germs, and any other impurities may then be removed. The removal of the same I prefer to accomplish by suction. When this has been accomplished, I then subject the grits or granules, still retained in their dry raw normal condition without any cooking, steaming, soaking, or other softening, to compression and without the necessity of heat being therewith employed.

To most thoroughly reduce the crushed material to the required product, I design to subject it to a drawing compression, whereby the granule is both compressed and at the same time drawn out into a very light thin tender curled film. To effect this, I pass the said crushed materials between smooth rollers, one of which travels faster than the other. In so doing the slower roll tends to hold the cereal, while the faster roll draws it out simultaneously with its compression into a light thin curled film having a large exposed surface. By this process all the cells of the cereal are most effectually laid open, ready to be quickly and thoroughly dissolved, as required, while every particle of nutriment is retained without the slightest loss or diminution of its strength. The retention of the full and entire strength of the cereal in this manner is a most important feature, and is effectually accomplished in a perfect degree in the reduction of the material, as above described, by a drawing compression while yet in its dry and raw condition.

It is obvious that when the material is soaked, steamed, or otherwise softened, as has heretofore been found indispensable, much of the strength of the cereals is inevitably lost. Moreover, in the subjection of the cereals in a softened moist condition to hot compression-rolls, as has heretofore been done, the surface of the flattened product is hardened, cooked, and glazed, not only diminishing the strength of the product, but also rendering it less readily soluble. The drawing out of the dry raw material simultaneous with its compression, not hitherto accomplished, reduces the material to a more attenuated form without powdering the same, more fully exposing the contents of the cells, so that they may be more fully and more quickly dissolved, saving both waste and time. The production therefore of a flattened curled product or film from the cereal, the material being retained and left in the same dry raw state continuously as that in which the process first found it, is a matter of much importance, an attainment far in advance of all others heretofore known and one of largely-increased utility.

For use as food such a product is readily prepared and is exceedingly tender, while retaining also all its sweetness and other nutritious properties, likely to be more or less dissipated by cooking, soaking, and heating, heretofore employed in the process of manufacture. The process, it will be seen, is very simple, thereby cheapening also the cost of production.

The mechanism employed in the formation of the article of manufacture herein described is essentially that embodied in United States Letters Patent No. 333,867, dated January 5, 1886, and consists of a supporting-frame A, on which are journaled rolls B and B'. Said rolls respectively are provided with gears $b^2$ and $b^3$, intermeshing with each other. The gear $b^3$ is made smaller than the gear $b^2$, so as to give a more rapid rotation to the roller B'.

C is a driving-pulley mounted on the same shaft as the roller B'.

In a case filed by me of even date herewith and bearing Serial No. 349,182 I have claimed, broadly, therein a product from cereals consisting of drawn or compressed films or flakes formed from the dry and raw material. I would therefore have it understood that I do not in this application seek to claim that claimed in the above-mentioned application.

What I claim as my invention is—

1. As a new article of manufacture, the herein-described product from corn, said product consisting of hulled and purified compressed films made from the raw material retained in its normally-dry character, substantially as described.

2. As a new article of manufacture, the herein-described product from corn, consisting of compressed films formed from the corn retained continuously in its normally dry and raw condition, substantially as described.

3. The herein-described process of producing films from corn, consisting in first crushing the cereal in its normally-dry condition to granules and subsequently subjecting said granules in their normally-dry condition to a drawing compression, substantially as described.

In testimony whereof I sign this specification in the presence of two witnesses.

FRANK LAUHOFF.

Witnesses:
N. S. WRIGHT,
CHARLES F. SALOW.